United States Patent
Baker

(10) Patent No.: US 10,980,216 B2
(45) Date of Patent: Apr. 20, 2021

(54) DEVICE FOR DETERRING ANIMALS FROM RESTING ON FURNITURE

(71) Applicant: Carl Baker, Middletown, NY (US)

(72) Inventor: Carl Baker, Middletown, NY (US)

( * ) Notice: Subject to any disclaimer, the term of this patent is extended or adjusted under 35 U.S.C. 154(b) by 213 days.

(21) Appl. No.: 15/464,380

(22) Filed: Mar. 21, 2017

(65) Prior Publication Data

US 2018/0271059 A1    Sep. 27, 2018

(51) Int. Cl.
| | | |
|---|---|---|
| *A01K 15/00* | (2006.01) | |
| *A47C 7/62* | (2006.01) | |
| *A01K 1/035* | (2006.01) | |
| *A47C 31/11* | (2006.01) | |

(52) U.S. Cl.
CPC .............. *A01K 15/00* (2013.01); *A01K 1/035* (2013.01); *A47C 7/62* (2013.01); *A47C 31/11* (2013.01)

(58) Field of Classification Search
CPC ........ A01K 15/00; A01K 15/04; A01K 15/00; A47C 31/11; A47C 31/10
USPC ......................................................... 206/443
See application file for complete search history.

(56) References Cited

U.S. PATENT DOCUMENTS

| | | | |
|---|---|---|---|
| 3,791,346 A * | 2/1974 | Willinger | A01K 1/035 119/456 |
| 5,702,791 A | 12/1997 | Zegeer | |
| 6,095,091 A | 8/2000 | Byrne | |
| 6,915,946 B2 * | 7/2005 | Gosis | B65D 5/0005 206/443 |
| 7,834,769 B2 | 11/2010 | Hinkle et al. | |
| 8,245,668 B1 | 8/2012 | Alberti et al. | |
| 2005/0098273 A1 | 5/2005 | DeBoard, II | |
| 2015/0342184 A1 * | 12/2015 | Miller | A01N 25/10 424/411 |
| 2016/0113412 A1 * | 4/2016 | Clark | A47C 7/546 297/227 |
| 2016/0207254 A1 * | 7/2016 | Moore, Jr. | B29C 65/34 |

OTHER PUBLICATIONS

PetzOFF, found: http://www.petzoff.com on Mar. 1, 2017, 1 pg.
https://www.amazon.com/X-Mat-Extra-Training-Flexible-18-Inch/dp/B00074W39U/ref=sr_1_5?ie=UTF8&qid=1488049679&sr=8-5&keywords=x-mat+pet+training+mat 6 pgs, found Mar. 1, 2017.
https://store.petsafe.net/scatmat-pet-proofing-mats, Dated Apr. 20, 2017.
https://www.couchcoat.com/?uid=EFOB3953E845A7AB36DCF5E8B382EA&gclid=CMv47u47uD5q91CFZeiswodhkcACg, Dated May 1, 2017.
https://www.amazon.com/Couch-Defender-Keep-Furniture-Beige/dp/B009JHYVNW/ref=sr_1_1?ie=UTF8&qid=1488049907&sr=8-1&keywords=couch+defender, 6 pgs, found Mar. 1, 2017.

* cited by examiner

*Primary Examiner* — William P Watkins, III

(74) *Attorney, Agent, or Firm* — Saile Ackerman LLC; Stephen B. Ackerman; Rosemary L. S. Pike

(57) ABSTRACT

A device to deter an animal from resting on furniture having a seating area comprises one or more sections of a rigid half-tubular form to be placed on the seating area, backrest, arm, and/or side of the furniture wherein the sections have a combined length to span approximately a width of the seating area, backrest, arm, or side. The half-tubular form can have the shape of an inverted half-cylindrical shape, a rectangular shape, a triangular shape, or a non-uniform relief shape wherein flat edges of the form are placed on the seating area, backrest, arm, or side of the furniture.

14 Claims, 4 Drawing Sheets

DEVICE FOR DETERRING ANIMALS FROM RESTING ON FURNITURE

TECHNICAL FIELD

The disclosure relates to deterring animals from resting on furniture, and more particularly, to deterring animals from resting on furniture by making it difficult or less inviting for them to access the furniture.

BACKGROUND

Pet owners often have difficulty in keeping companion animals, such as dogs or cats, from lying on furniture. The result is soiling furniture with shed fur, skin oil, dirt, discoloring, insects, bodily fluids, and general damage and premature wear. Traditional methods for blocking access to furniture include such things as placing obstructions such as boxes and other miscellaneous items including chairs on the furniture to keep pets off. Additionally, electronic devices such as motion-activated deterrents, voice, electrical stimulation, noise, including ultrasonics, and so on, have been attempted. Physical barriers, blankets, pads, and mylar sheeting have been used. Most if not all of these methods fail. The animal either moves the obstruction rather easily or gets used to the attempted deterrent.

U.S. Patent Application 2005/0098273 (DeBoard) and U.S. Pat. No. 8,245,668 (Alberti et al), U.S. Pat. No. 6,095,091 (Byrne), and U.S. Pat. No. 5,702,791 (Zegeer) show various barriers to place on furniture.

SUMMARY

A principal object of the present disclosure is to provide a safe, effective, and pain-free method of deterring animals from resting on furniture.

Another object of the disclosure is to provide a safe, effective, and pain-free method of deterring animals from resting on furniture that is easy to use and store when not in use.

In accordance with the objects of the disclosure, a deterrent device is provided. A device to deter an animal from resting on furniture having a seating area comprises one or more sections of a rigid half-tubular form to be placed on the seating area, backrest area, and/or arms of the furniture wherein the sections have a combined length to span approximately a width of the seating area, backrest area, or arms. The half-tubular form can have the shape of an inverted half-cylindrical shape, a rectangular shape, a triangular shape, or a non-uniform relief shape wherein flat edges of the form are placed on the seating area, backrest area, or arms.

Also in accordance with the objects of the disclosure, a method for deterring a pet from resting on a seating area, backrest area, or arms of furniture is provided. One or more sections of a half-tubular form are provided having a combined length to span approximately a width of the seating area, backrest area, or arms. The one or more sections of the half-tubular form are placed on the seating area, backrest area, or arms to make this area inaccessible, inconvenient, less inviting, or uncomfortable for the pet.

Also in accordance with the objects of the disclosure, a method for deterring a pet from accessing a seating area, top of backrest area, arm, or side surface of furniture is provided. A plurality of sections of a half-tubular form are provided. One or more of the following steps are performed: placing one or more of the sections of the half-tubular form on the seating area wherein the one or more sections combine to span approximately a width of the seating area; placing one or more of the sections of the half-tubular form on a top surface of the backrest area wherein the one or more sections combine to span approximately a width of the backrest area; placing one or more sections of the half-tubular form on a top surface of the arm; placing one or more sections of the half-tubular form vertically over a front surface of the arm; and placing one or more sections of the half-tubular form vertically covering the side surface of the furniture wherein the sections make the seating area, arm, or side surface inaccessible or uncomfortable for the pet.

BRIEF DESCRIPTION OF THE DRAWINGS

In the accompanying drawings forming a material part of this description, there is shown.

DETAILED DESCRIPTION

The deterrent device of the present disclosure provides a passive, pain-free method of deterring animals from resting on the furniture. The device is easy to use and store when not in use. It provides a safe barrier to access that an animal cannot easily manipulate. When properly placed, the device precludes easy manipulation by a pet. Proper placement may also deter cats from scratching furniture and may deter pets from soiling legs and sides of furniture.

Figure 1:
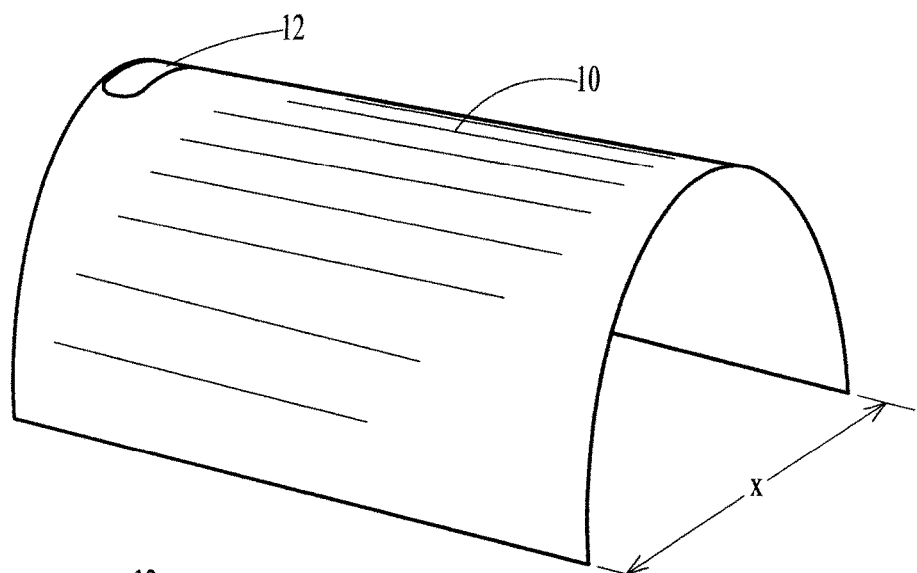
FIGS. 1 and 2 schematically illustrate isometric views of a deterrent device of the present disclosure.
Figure 2:
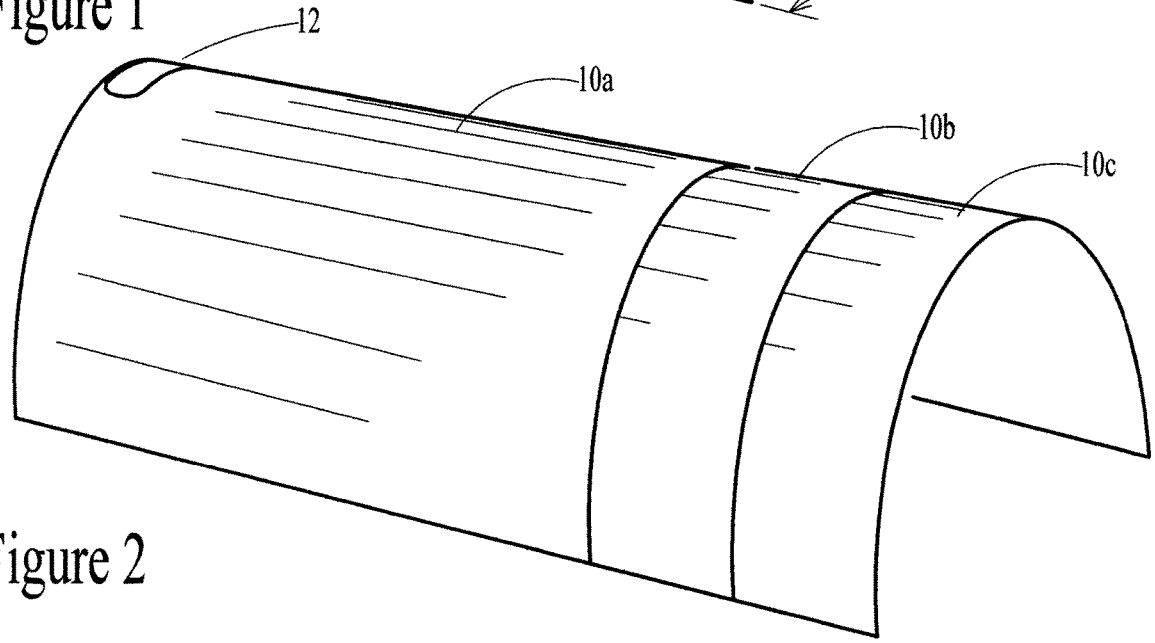
Figure 3:
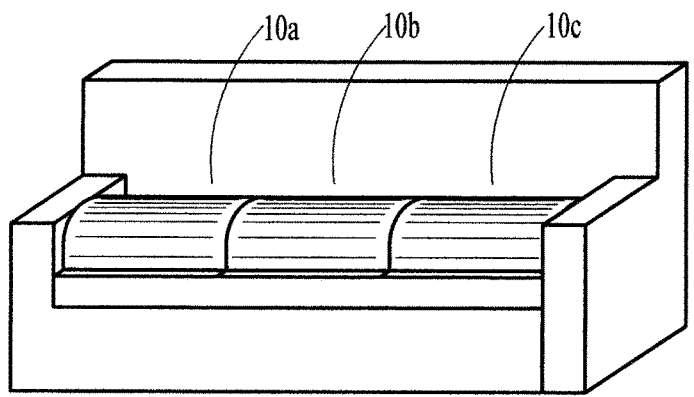
FIGS. 3 through 5 illustrate possible uses of the deterrent device of the present disclosure.

Referring now to FIGS. 1-2, the deterrent device of the present disclosure is described in detail. The device 10 is a rigid half-tubular form, having the preferred shape of a half-cylinder. For example, three 24" sections of half-cylinder, 10a, 10b, and 10c, can be placed end-to-end on the seating area of a sofa, as illustrated in FIG. 3. It has been found that dogs will not attempt to jump onto the sofa when the half-cylinders are on the sofa seat. It is difficult for an animal to jump onto the seating surface when the form is present. In addition, if the animal is able to jump onto the seating area, the form is uncomfortable to lie on because of its non-flat surface.

The sections can easily be nested for storage when not placed on the sofa. FIG. 2 illustrates partial nesting of the device sections 10a, 10b, and 10c. Shorter sections of 16-18", for example, can protect chairs.

To use, place the stack of half-cylinders on the furniture and spread them out to deter pets. When finished, scoop the half-cylinders back into a stack and store them. For example, the stack may be stored vertically near a rear corner of the furniture.

The half-cylinders may be made of plastic, wood, bamboo, paper fiber, or any other material of structural integrity. The preferred thickness of the material is between about 0.0050 to ⅜", for example. The preferred diameter X is between about 12 and 14" and the preferred section length is between about 16 to 24". However, larger or smaller lengths or radii can be used, if preferred. The finish of the half-cylinder may be smooth or textured. Hand-holds 12 may be cut into the edge of each section to facilitate gripping and handling. For example, hand-holds may be offset 0.5 to 1.5 inches from the end of the section, one on each section or one on each end of each section.

Figure 6A:
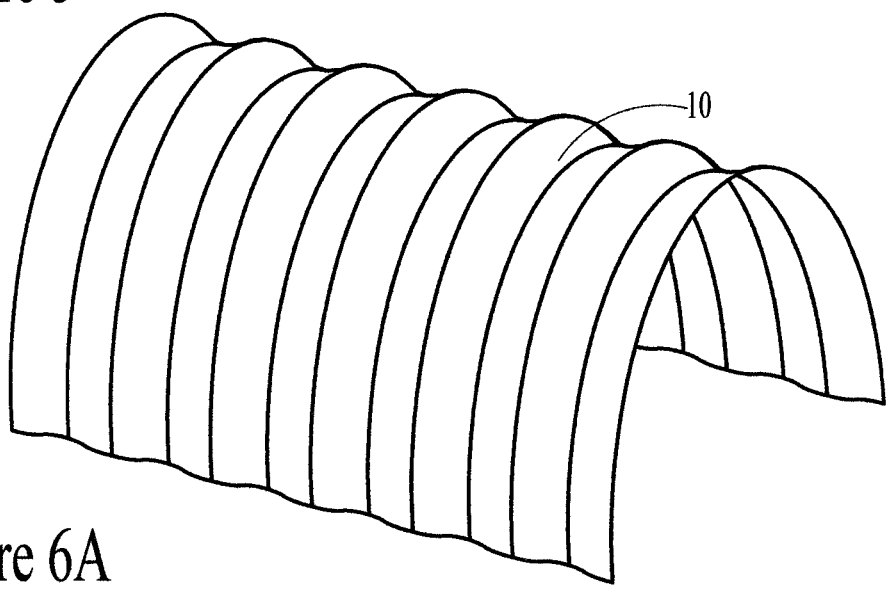
FIGS. 6A-6G schematically illustrate isometric views of alternative shapes of a deterrent device of the present disclosure.
Figure 6B:
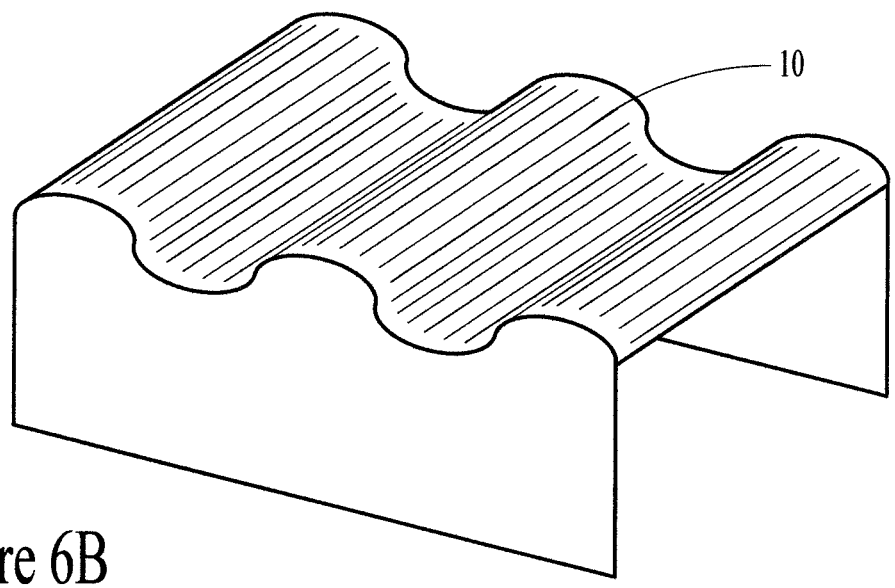
Figure 6C:
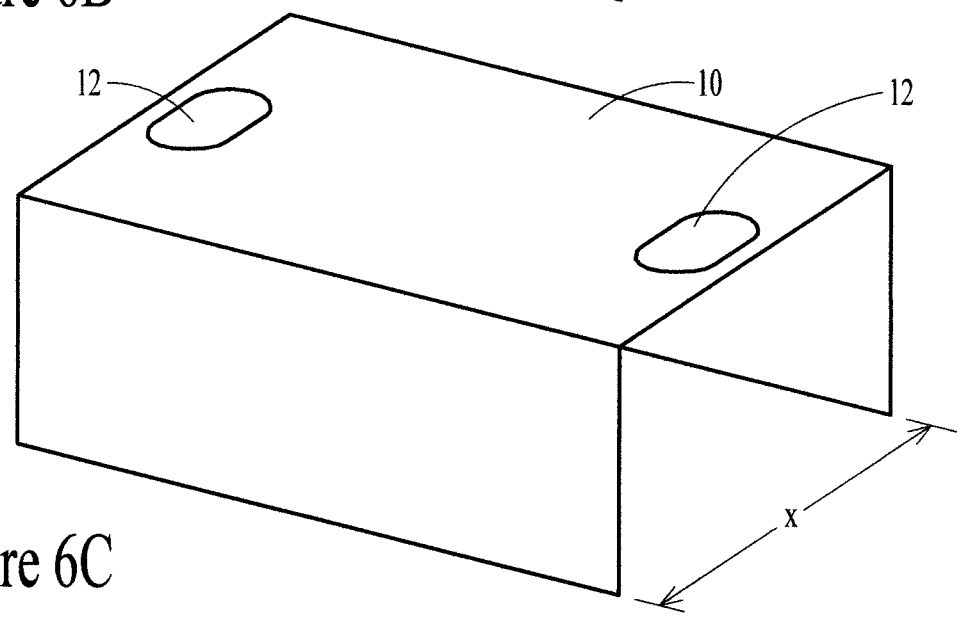
Figure 6D:
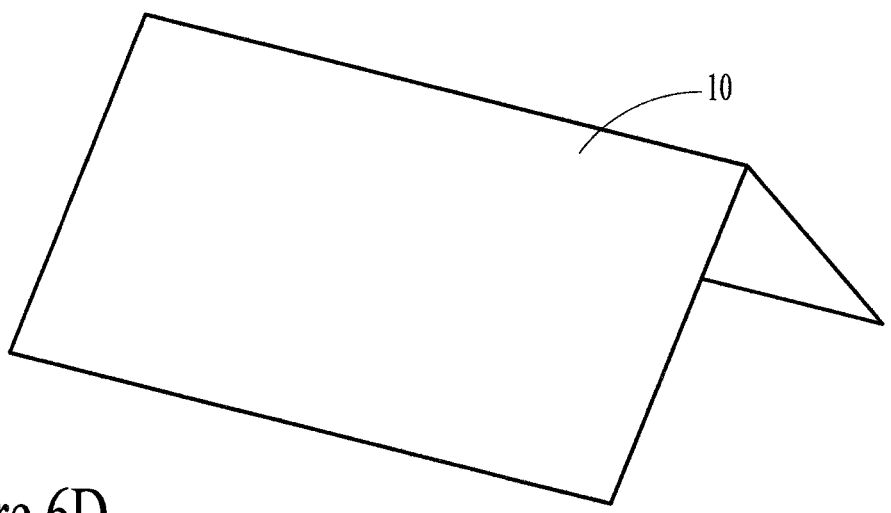
Figure 6E:
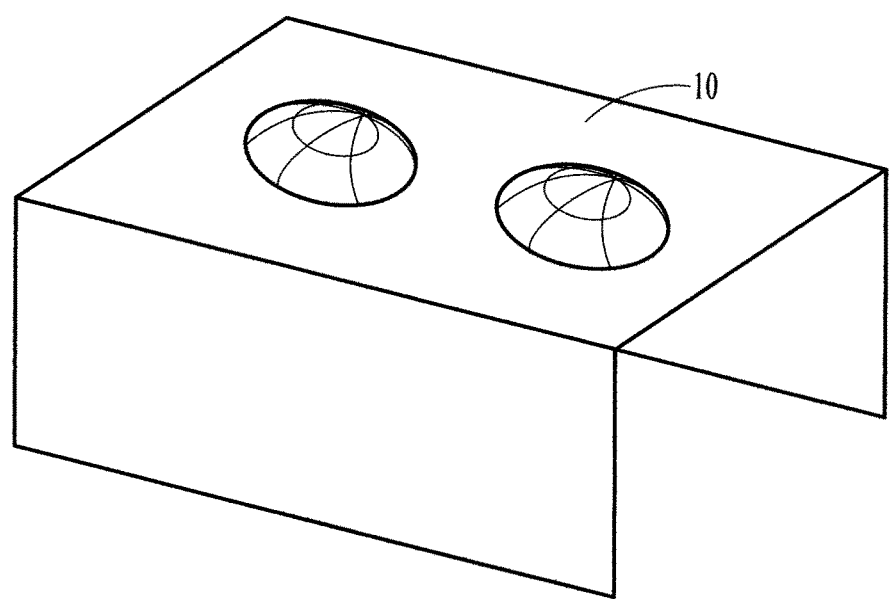
Figure 6F:
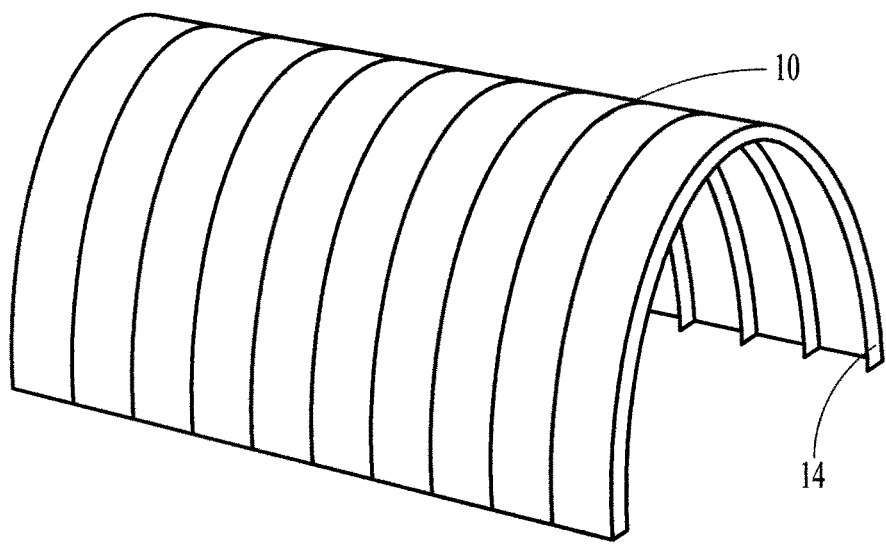
Figure 6G:
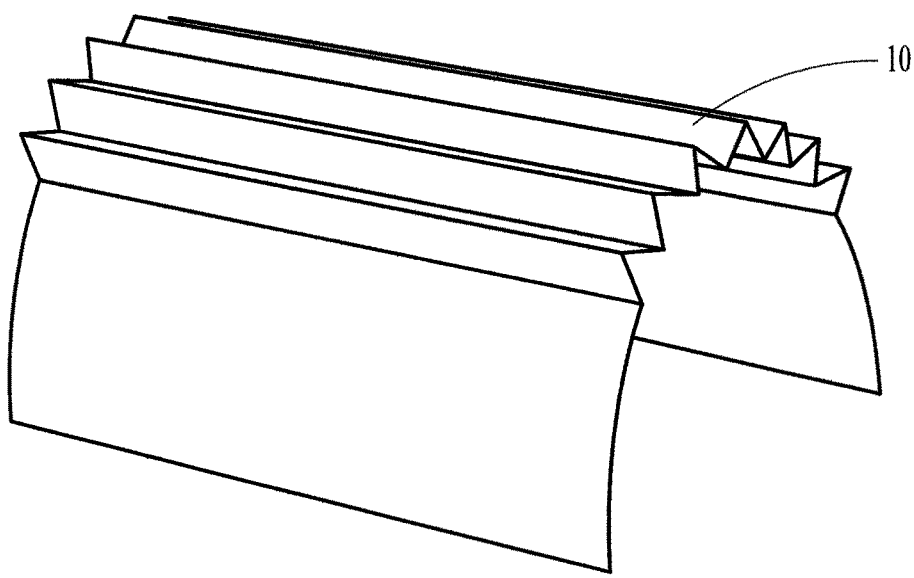

In addition to half-cylinder shape, ribs (FIG. 6A), ridges (FIG. 6B), squares, rectangles (FIG. 6C), triangular (FIG. 6D), and other raised or embossed or inset relief shapes (FIGS. 6E and 6G) can be used. FIG. 6F illustrates structural ribs 14 on the underside and/or top surface of the shape to add rigidity. The ribs could be scored or raised. It will be understood that other shapes can be utilized as well. The preferred distance X between the walls of the shapes is about 12 to 16", but other distances can be used to provide adequate coverage of the furniture surface to be protected. In the case of a flat surface as in FIG. 6C, the dimension X can be chosen so that the flat surface is too small for the animal to lie on comfortably. Furthermore, the flat surface could be textured to make it uncomfortable. Angles of up to 90 to 120 degrees could be employed. A variety of colors and patterns may be employed.

Figure 4:
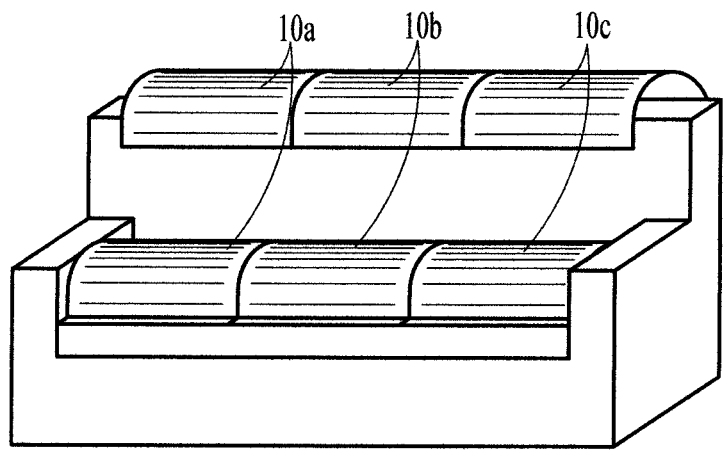
Figure 5:
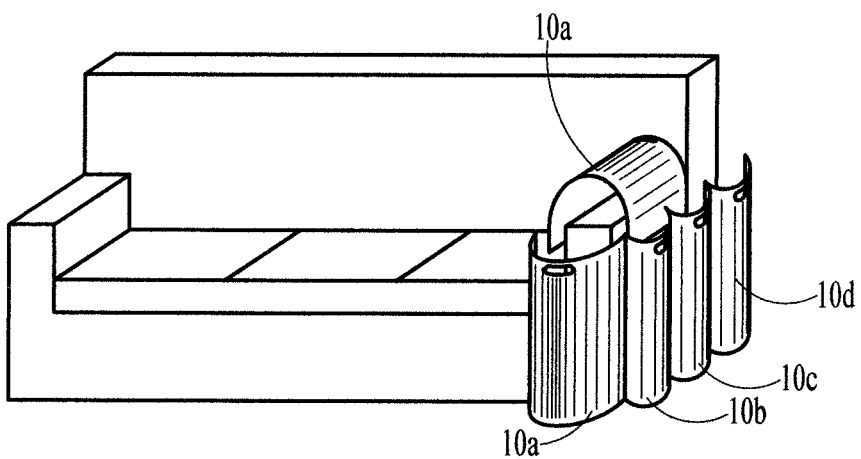

In addition to placing the deterrent devices on the seat portions of furniture, sections of the device may be placed horizontally on the top of the backrest portion of the furniture, as illustrated in FIG. 4 to deter smaller animals that prefer to rest there. Also, sections of the device may be placed vertically on the floor to cover the legs or sides of furniture to deter scratching or soiling the furniture. This is illustrated in FIG. 5 where sections 10a, 10b, 10c, and 10d are placed to shield a sofa arm and side. A section 10e is placed on a top surface of the arm of the sofa to prevent an animal from resting on the arm.

The deterrent device of the present disclosure makes the seating area, backrest area, arms, and/or sides of furniture inaccessible, inconvenient, less inviting, or uncomfortable for the pet without injuring or scaring the pet. The device is rigid, compact, and easy to use and store.

Although the preferred embodiment of the present disclosure has been illustrated, and that form has been described in detail, it will be readily understood by those skilled in the art that various modifications may be made therein without departing from the spirit of the disclosure or from the scope of the appended claims.

What is claimed is:

1. A device to deter an animal from easily accessing furniture having a seating area, a backrest area, and/or one or more arms, comprising:
    one or more discrete independently functioning sections of a rigid non-planar form having wall portions and a non-planar central portion between said wall portions, said form configured to be placed on one or more of said seating area, a top surface of said backrest area, and a top surface of said arms of said furniture wherein said wall portions rest on one or more of said seating area, said top surface of said backrest area, and said top surface of said arms of said furniture and wherein said central portion is raised above the underlying surfaces, wherein said one or more sections have a combined length to span approximately a width of said seating area, backrest area, or arms of said furniture, respectively, wherein each section has a length of less than or equal to 24 inches, wherein at least one of said sections has a hand-hold cutout, and wherein said device is configured to deter an animal from attempting to access said furniture.

2. The device according to claim 1 wherein a plurality of said one or more sections of said rigid non-planar form nest together to form a compact assembly for storage purposes.

3. The device according to claim 1 wherein said rigid non-planar form comprises an inverted half-cylindrical shape, a triangular shape, or a non-uniform relief shape.

4. A method for deterring a pet from easily accessing a seating area, backrest area, or arm of furniture comprising:
    providing one or more sections of a rigid non-planar form having wall portions and a central portion between said wall portions, said form to be placed on one or more of said seating area, a top surface of said backrest area, and a top surface of said arms of said furniture having a combined length to span approximately a width of said seating area, backrest area, or arms, respectively; and
    placing said one or more sections of said rigid non-planar form on one or more of said seating area, said top surface of said backrest area, and said top surface of said arms wherein said wall portions rest on said one or more of said seating area, said top surface of said backrest area, and said top surface of said arms of said furniture and wherein said central portion is raised above any of the underlying surfaces to make said seating area said backrest area, or said arms inaccessible, inconveniently accessible, less inviting, or uncomfortable for said pet.

5. The method according to claim 4 further comprising nesting together a plurality of said one or more sections of said rigid non-planar form for storage purposes.

6. The method according to claim 4 wherein at least one of said sections of said rigid non-planar form has a hand-hold cutout.

7. The method according to claim 4 wherein said rigid non-planar form comprises an inverted half-cylindrical shape, a rectangular shape, a triangular shape, or a non-uniform relief shape.

8. The method according to claim 7 wherein said central portion of said rigid non-planar form comprises raised or embossed areas.

9. The method according to claim 7 wherein said rigid non-planar form has structural ribs on one or more of top and underside of said form to provide rigidity.

10. A method for deterring a pet from easily accessing a seating area, backrest area, arm, or side surface of furniture comprising:
    providing a plurality of sections of a rigid non-planar form having wall portions and a central portion between said wall portions; and
    performing one or more of the following steps:
    placing one or more of said sections of said rigid non-planar form on said seating area wherein said wall portions rest on said seating area and wherein said central portion is raised above said seating area, wherein said one or more sections combine to span approximately a width of said seating area;
    placing one or more of said sections of said rigid non-planar form on a top surface of said backrest area wherein said wall portions rest on said top surface of said backrest area and wherein said central portion is raised above said top surface of said backrest area wherein said one or more sections combine to span approximately a width of said backrest area;
    placing one or more sections of said rigid non-planar form on a top surface of said arm wherein said wall portions rest on said arm and wherein said central portion is raised above said arm;
    placing one or more sections of said rigid non-planar form vertically over a front surface of said arm wherein said wall portions rest on said arm and wherein said central portion is raised above said arm; and placing one or more sections of said rigid non-planar form vertically covering said side surface of said furniture wherein said wall portions rest on said side of surface of said furniture and wherein said central portion is raised above said side of surface of said furniture wherein said sections make said seating area, backrest area, arm, or side surface inaccessible, inconveniently accessible, less inviting, or uncomfortable for said pet.

11. The method according to claim 10 further comprising nesting together said plurality of sections of said rigid non-planar form for storage purposes.

12. The method according to claim 10 wherein at least one of said sections of said rigid non-planar form has a handhold cutout.

13. The method according to claim 10 wherein said rigid non-planar form comprises an inverted half-cylindrical shape, a rectangular shape, a triangular shape, or a non-uniform relief shape and wherein said half-tubular form is smooth or textured or comprises raised or embossed areas.

14. The method according to claim 13 wherein said rigid non-planar form has structural ribs on one or more of top and underside of said form to provide rigidity.

* * * * *